United States Patent
Hayden et al.

(10) Patent No.: US 12,079,369 B2
(45) Date of Patent: Sep. 3, 2024

(54) SYSTEMS AND METHODS FOR SYNTHETIC IDENTITY DETECTION

(71) Applicant: Early Warning Services, LLC, Scottsdale, AZ (US)

(72) Inventors: Dan Hayden, Corinth, TX (US); Sandra Letterly, Scottsdale, AZ (US); Robin Love, Phoenix, AZ (US); Matt Cottrell, Phoenix, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 154 days.

(21) Appl. No.: 17/842,598

(22) Filed: Jun. 16, 2022

(65) Prior Publication Data

US 2023/0409738 A1    Dec. 21, 2023

(51) Int. Cl.
*G06F 21/60*    (2013.01)
*G06F 21/62*    (2013.01)

(52) U.S. Cl.
CPC ................ *G06F 21/6245* (2013.01)

(58) Field of Classification Search
None
See application file for complete search history.

(56) References Cited

U.S. PATENT DOCUMENTS

| 9,836,510 B2 | 12/2017 | Love et al. |
| 2023/0080885 A1* | 3/2023 | Dalpini ............ G06F 21/552 726/23 |

* cited by examiner

*Primary Examiner* — Cai Y Chen
(74) *Attorney, Agent, or Firm* — Kilpatrick Townsend & Stockton LLP (57) ABSTRACT

A synthetic identity detection network may include a communications interface, one or more processors, and a memory having instructions stored thereon. The instructions cause the processors to receive a data inquiry from a requesting system. The data inquiry may include personally identifiable information (PII) data associated with a user. The instructions cause the processors to match the PII data to a plurality of user identities. Each user identity may be associated with at least a portion of the PII data. The instructions cause the processors to identify account statuses associated with accounts associated with the user identities. The instructions cause the processors to generate a code based at least in part on a count of the user identities and the account statuses. The code provides an indication of a likelihood of the user being a synthetic identity. The instructions cause the processors to transmit the code to the requesting system.

20 Claims, 6 Drawing Sheets

SYSTEMS AND METHODS FOR SYNTHETIC IDENTITY DETECTION

BACKGROUND OF THE INVENTION

Fraud detection systems are often implemented to help identify fraudulent behavior to help minimize risk to parties of a given interaction. As a particular example, fraud detection systems may be used to identify the use of stolen identities, to detect the use of stolen cards or property, and/or other misuse of payment or access media. However, such systems may not adequately protect parties from interactions with synthetic identities, which are established by using identity data that has been manufactured and collectively does not belong to a real person. Fraudulent activity involving the use of synthetic identities presents a growing problem that is not addressed by conventional fraud detection systems. Therefore, improvements in fraud detection systems are desired.

BRIEF SUMMARY OF THE INVENTION

Some embodiments of the present technology may encompass synthetic identity detection networks. The networks may include a communications interface. The networks may include one or more processors. The networks may include a memory having instructions stored thereon. When executed by the one or more processors, the instructions may cause the one or more processors to receive, using the communications interface, a synthetic identity data inquiry from a requesting computing system. The synthetic identity data inquiry may include personally identifiable information (PII) data associated with a user. The instructions may cause the one or more processors to match the PII data to a plurality of user identities. Each of the plurality of user identities may be associated with at least a portion of the PII data associated with the user. The instructions may cause the one or more processors to identify an account status associated with each of one or more accounts associated with the plurality of user identities. The instructions may cause the one or more processors to generate a synthetic identity code based at least in part on a count of the plurality of user identities and the account statuses. The synthetic identity code may provide an indication of a likelihood of the user being a synthetic identity. The instructions may cause the one or more processors to transmit, using the communications interface, the synthetic identity code to the requesting computer system.

In some embodiments, the PII data may include an email address associated with the user, a mailing address associated with the user, and tax identifier associated with the user. The instructions may cause the one or more processors to identify a type of the mailing address. Identifying the type of the mailing address may include receiving a code that is indicative of the type of the mailing address. Matching the PII data to the plurality of user identities may include performing an entity resolution process. The instructions may cause the one or more processors to generate an identity confidence score associated with the user. The identity confidence score may be indicative of a likelihood that the user has provided an authentic identity. The instructions may cause the one or more processors to provide the identity confidence score to the requesting computer system. The synthetic identity code may be selected from a plurality of synthetic identity codes. Each of the plurality of synthetic identity codes may be indicative of a certain type of behavior and likelihood that a synthetic identity is being utilized.

Some embodiments of the present invention may encompass methods of generating a synthetic identity code. The methods may include receiving a synthetic identity data inquiry from a requesting computing system. The synthetic identity data inquiry may include personally identifiable information (PII) data associated with a user. The methods may include matching the PII data to a plurality of user identities. Each of the plurality of user identities may be associated with at least a portion of the PII data associated with the user. The methods may include identifying an account status associated with each of one or more accounts associated with the plurality of user identities. The methods may include generating a synthetic identity code based at least in part on a count of the plurality of user identities and the account statuses. The synthetic identity code may provide an indication of a likelihood of the user being a synthetic identity. The methods may include transmitting the synthetic identity code to the requesting computer system.

In some embodiments, the PII data may include a mailing address associated with the user. The methods may further include reformatting the mailing address into a standardized post office format. Generating the synthetic identity code may include passing a number of variables into an algorithm to determine the synthetic identity code. The number of variables may include the count of the plurality of user identities and the account statuses. Each of the number of variables may be assigned a predetermined weight. Matching the PII data to a plurality of user identities may include comparing each item within the PII data to stored PII data associated with known user identities that is stored on one or more databases. The synthetic identity code may indicate that the likelihood of the user being a synthetic identity is less than about 10%. The synthetic identity code may further indicate a rationale associated with the likelihood of the user being a synthetic identity. The synthetic identity code may be selected from a plurality of synthetic identity codes. Each of the plurality of synthetic identity codes may indicate an overall rationale associated with the likelihood of the user being a synthetic identity. At least some of the plurality of synthetic identity codes may include one or more sub-rationales categorized under the overall rationale of the respective synthetic identity code.

Some embodiments of the present invention may encompass non-transitory computer-readable media. The media may include instructions stored thereon that, when executed by one or more processors, cause the one or more processors to receive a synthetic identity data inquiry from a requesting computing system. The synthetic identity data inquiry may include personally identifiable information (PII) data associated with a user. The instructions may cause the one or more processors to match the PII data to a plurality of user identities. Each of the plurality of user identities is associated with at least a portion of the PII data associated with the user. The instructions may cause the one or more processors to identify an account status associated with each of one or more accounts associated with the plurality of user identities. The instructions may cause the one or more processors to generate a synthetic identity code based at least in part on a count of the plurality of user identities and the account statuses. The synthetic identity code may provide an indication of a likelihood of the user being a synthetic identity. The instructions may cause the one or more processors to transmit the synthetic identity code to the requesting computer system.

In some embodiments, the PII data may include a tax payer identifier. The instructions may cause the one or more processors to determine whether the tax identifier is associated with a living person. Generating the synthetic identity code may be further based on one or both of a type of a mailing address of the user and a living status associated with a tax identifier of the user. The count of the plurality of user identities may include at least one count selected from a group consisting of a count of a number of user identities associated with a particular email address, a count of a number of user identities associated with a particular mailing address, a count of a number of user identities associated with a particular account, and a count of a number of user identities associated with a particular phone number. Matching the PII data to the plurality of user identities may include performing an entity resolution process to standardize a format of at least some items within the PII data to identify the plurality of user identities. At least one account status may indicate that an associated account was closed for cause.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to systems and methods for synthetic identity detection. Synthetic identities are fabricated identities that are established by using identity data (some of which may have been manufactured) that collectively does not belong to a real person. Such synthetic identities may be used by fraudsters to defraud others in numerous circumstances, such as to seek employment with fake credentials, hide a criminal history, and/or to financially defraud one or more people or entities. Embodiments may provide synthetic identity networks that use personally identifiable information (PII) to detect a likelihood that a particular user is utilizing a synthetic identity, and may alert affected parties of the likelihood. For example, the synthetic identity network may generate a synthetic identity code that indicates the likelihood that the user is using a synthetic identity, and in some embodiments may provide an indication of what behavior of the user is associated with the likelihood. In some embodiments, along with the synthetic identity code, the synthetic identity network may generate and communicate an identity confidence score that may provide an indication of a likelihood that the user has provided an authentic identity. In other words, the identity confidence score may indicate how likely the user is who he/she says he/she is. On its own, the identity confidence score may provide a good indication of whether a user is a fraudster or is otherwise a bad actor, particularly when the identity confidence score is below a certain threshold level. However, middle ranges of the identity confidence score may provide less clear answers as to the authenticity of a given user. When used in conjunction with the synthetic identity code, the identity confidence score may provide requesting party with an accurate indication of whether a user's identity is trustworthy, even when middle ranges of identity confidence scores are generated, as the use of the identity confidence score and the synthetic identity code provides multiple data points that provide a more complete picture of a given user's behavior.

Figure 1:
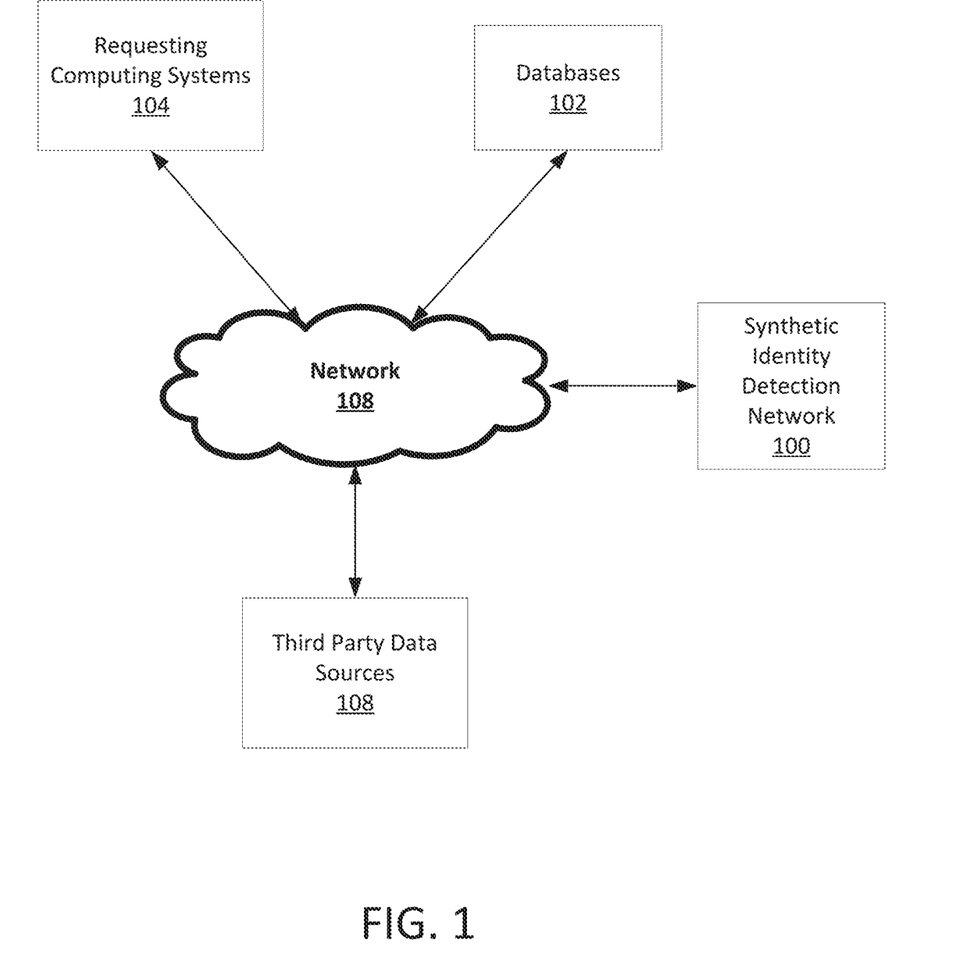
FIG. 1 illustrates a system for performing synthetic identity detection according to embodiments of the present invention.

Turning now to FIG. 1, a system for performing synthetic identity detection is illustrated. The system may include a synthetic identity detection network 100, which may be in communication with a number of different computing systems, including, but not limited to, local and/or remote databases 102, requesting computing systems 104, and/or third party data sources 106 via one or more networks 108. The synthetic identity detection network 100 may receive a synthetic identity data inquiry from a requesting computing system 104 that includes PII data associated with a particular user. For example, the PII data may include a name, date of birth, email address, mailing address, mobile phone number, business phone number, home phone number, fax number, tax identification number, driver's license identifier, patient identification number, financial account number, credit card number, passport number, and/or other information that may be used to determine an identity of an individual. The synthetic identity detection network 100 may utilize the PII data to retrieve additional information associated with all or a portion of the PII data to identify whether some or all of the PII data is linked and/or has been used by any known user identities (real or fake). In some embodiments, the synthetic identity detection network 100 may access data from databases 102 and/or third party data sources 106 that is further indicative of synthetic behavior. For example, one or more of the databases 102 may be populated with trustworthy data from entities that the synthetic identity detection network 100 has previously established relationships with, such as credit bureaus, criminal records databases, financial institutions, etc. In some embodiments, the trustworthy data stored on the databases 102 may include data that use of a synthetic identity may be intended to hide (such as a criminal background) and/or data that may (alone or in combination with other data) be indicative of the use of a synthetic identity (such as detailed account data for financial accounts associated with the various user identities, credit scores of the user identities, etc.). For example, the synthetic identity detection network 100 may leverage its relationships with various financial institutions 100 to identify one or more financial accounts associated with a given user that are stored on one or more of the databases 102. The synthetic identity detection network 100 may access and aggregate account data from each of the financial accounts identified as being associated with the user to identify various information about each account, such as a balance, an account open date, an account close date, whether a closed account was closed for cause, and/or other account information. The data may be aggregated for each financial account associated with some or all of the PII data to provide an indication of account history of the user, which may be analyzed to determine if the account history is indicative of a synthetic identity.

The synthetic identity detection network 100 may also access and aggregate data from one or more third party sources 106. For example, personal identifiable information (PII) of the user may be matched with information from one or more third party data sources 106 to determine whether a tax payer identifier is associated with a living or deceased person, to identify what type of mailing address is associated with the user, and/or other make other determinations. Based on all or some of the retrieved data from databases 102 and/or third party sources 106, as well as the PII data and/or any known user identities associated with the PII data, the synthetic identity detection network 100 may generate a synthetic identity code that provides an indication of a likelihood of the user being a synthetic identity. This synthetic identity code may be transmitted to the requesting computing system 104 to inform the requesting computing system 104 of whether the user associated with the synthetic identity data inquiry is likely to be using a real or synthetic identity.

In some embodiments, in addition to the synthetic identity code, the synthetic identity network 100 may generate an identity confidence score associated with the user. The identity confidence score may be indicative of a likelihood that the user has provided an authentic identity. This identity confidence score may be transmitted to the requesting computing system 104, and together with the synthetic identity code may provide an enhanced indication of the trustworthiness of a given user.

System may include any number of requesting computing devices 104 that may submit synthetic identity data inquiries to the synthetic identity network 100. For example, the requesting computing devices 104 may be associated with people and/or entities (such as business entities, employers, landlords, and/or other organizations) that may want an indication of whether a particular user interacting with the entity has provided a real or synthetic identity to help the entity better determine a level of risk associated with the interaction. As part of the interaction with the user, the entity may collect various PII data from the user and submit the PII data to the synthetic identity detection network 100 as part of a synthetic identity data inquiry associated with the user. The requesting computing devices 104 may interact with the synthetic identity network 100 via one or more wired and/or wireless networks 108. Data transmitted across the networks 108 may be secured using encryption techniques, hypertext transfer protocol secure (HTTPS), secure sockets layer (SSL), transport layer security (TLS), and/or other security protocol. The requesting computing devices 104 may include mobile phones, tablet computers, personal computers, e-readers, and the like. In some embodiments, the requesting computing devices 104 may include computing devices, such as point of sale devices, that may be positioned at brick-and-mortar locations of a given entity that may be usable to interact with the synthetic identity network 100.

As noted above, the system may include one or more databases 102 that include stored PII data associated with a number of different users. The databases 102 may be owned, operated, and/or otherwise associated with credit bureaus, criminal records databases, financial institutions, and/or other entities, and may store PII data, credit records, criminal records, financial account information (such as records of balances associated with each account, records of transactions (e.g., debits and credits) associated with the various accounts, an account open date, an account close date, whether a closed account was closed for cause, and/or other account information), and/or other data that may be used in detecting a synthetic identity. Each entity associated with one or more of the databases 102 may include one or more computing systems that facilitate interactions with users, back-end systems, synthetic detection network 100, requesting computing devices 104, and/or the databases 102.

As noted above, the system may include one or more third party data sources 106. Third party data sources 106 may provide one or more types of data that may or may not be available (or readily identifiable) within account data from the entities associated with databases 102. For example, the third party data sources 106 may provide information about whether a tax payer identifier is associated with a living or deceased person, to identify what type of mailing address is associated with the user, and/or other make other determinations. For example, the third party data sources 106 may include death registries (such as, but not limited to the Death Master File maintained by the Social Security Administration) that may use PII (such as a social security number or other tax payer identifier) to look up whether a user is listed as having been deceased. The third party data sources 106 may include an address verification entity (such as a postal service and/or third party) that may provide information on how a particular address is classified (e.g., residential, business, hospital, etc.).

Figure 2:
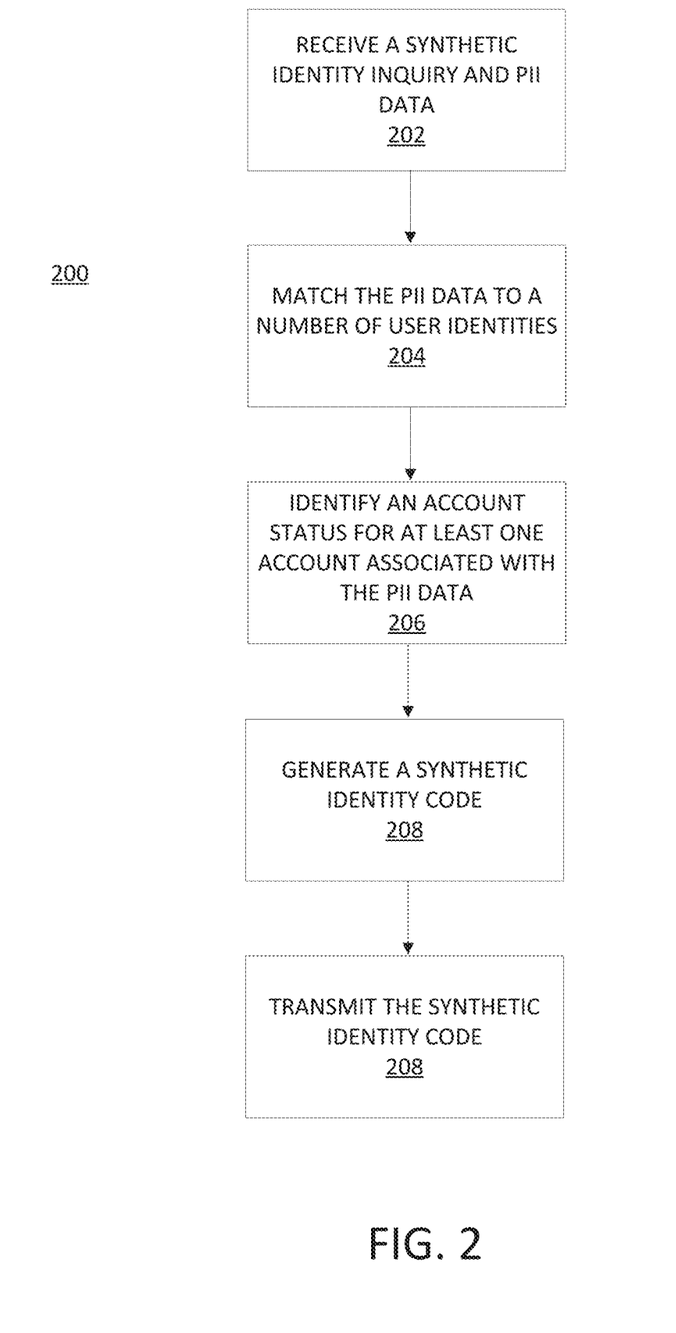
FIG. 2 is a flowchart depicting a process of generating a synthetic identity code according to embodiments of the present invention.

FIG. 2 is a flowchart depicting a process 200 of generating a synthetic identity code according to one embodiment of the present invention. Process 200 may be performed by the synthetic identity detection network 100. Process 200 may begin at operation 202 by receiving, from a requesting computing device 104, a synthetic identity data inquiry. In some embodiments, the data inquiry may be associated with a criminal background check, a credit check, a financial transaction (such as, but not limited to, a loan (secured or unsecured), a line of credit (including a credit card account), a mortgage, and/or other type of borrowed funds), and/or other situation. The data inquiry may be made by a requesting party, who may be seeking to verify that the identity of a particular user associated with the data inquiry is authentic and actually belongs to the user. The requesting party may use any information provided by the synthetic identity network 100 in making an approval decision or other determination. The data inquiry may include one or more identifiers (such as personal identifiable information (PII)) associated with the user. The PII data may include, without limitation, a name, date of birth, email address, mailing address, mobile phone number, business phone number, home phone number, fax number, tax identification number (e.g., a social security number), driver's license identifier, patient identification number, financial account number, credit card number, passport number, and/or other information that may be used to determine an identity of an individual.

Upon receiving the data inquiry, the synthetic identity detection network 100 may match the PII data to a number of user identities (which may or may not be the same actual person) at operation 204. For example, each item (or a subset of items) within the PII data may be compared to stored PII data within the databases 102 and/or with the third party data sources 106 to identify one or more user identities. Each of the user identities may be associated with at least one item of the PII data associated with the user. For example, one user identity may match with a name in the PII, while another user identity may be associated with an email address, SSN, and/or mailing address of the PII data. Any number of user identities may be matched to any combination of PII data present within the data inquiry. The data inquiry may include any form or amount of PII data, such as, but not limited to, a name, date of birth, email address, mailing address, mobile phone number, business phone number, home phone number, fax number, tax identification number, driver's license identifier, patient identification number, financial account number, credit card number, passport number, and/or other information that may be used to determine an identity of an individual. In some embodiments, matching the PII data to a number of user identities may include performing an entity resolution procedure (discussed in greater detail below with respect to FIG. 3) to standardize some or all of the PII (such as names, mailing addresses, and the like) into a common format to provide better results with the matching procedure.

At operation 206, the synthetic identity detection network 100 may identify an account status associated with each of one or more accounts associated with the plurality of user identities. For example, the synthetic identity detection network 100 may access one or more of the databases 102 to determine whether one or more of the accounts associated with the plurality of users has been closed for cause (e.g., a financial institution deemed that the account was overdrawn too many times, was used to commit fraud, and/or was associated some other undesirable activity) and/or is associated with other activity that may be indicative of the use of a synthetic identity.

In some embodiments where the PII data includes a mailing address associated with one or more user identities, the synthetic identity network 100 may identify a type of the mailing address. For example, the synthetic identity network 100 may poll an address verification entity (such as a postal service and/or third party) that may provide information on how a particular address is classified (e.g., residential, business, hospital, prison, nursing home, etc.). In some embodiments, the synthetic identity network 100 may reformat the mailing address into a standardized post office format, which may be part of an entity resolution process as described elsewhere herein. In some embodiments, the synthetic identity network 100 may receive a description of the address classification, while in other embodiments the synthetic identity network 100 may receive a code that is indicative of the type of the mailing address. Use of a non-residential address as a mailing address may be indicative that a user is utilizing a synthetic identity.

In some embodiments, such as where the PII data includes a tax payer identifier, the synthetic identity network 100 may determine whether the tax identifier is associated with a living person. For example, the synthetic identity network 100 may poll a third party data source 106, such as a death registry, to look up whether a user identify associated with the tax payer identifier is listed as having been deceased. Use of a taxpayer identifier associated with a deceased person may be indicative that a user is utilizing a synthetic identity.

In some embodiments, the synthetic identity network 100 may count a number of user identities that match all or part of the PII data. For example, the synthetic identity network 100 may count a number of user identities associated with a particular email address, a count of a number of user identities associated with a particular mailing address, a count of a number of user identities associated with a particular account, and a count of a number of user identities associated with a particular phone number. For example, it may be reasonable for a family (or portion thereof) to share a phone number, mailing address, bank account, email address, or other form of PII data. However, if a number of user identities associated with a given type of PII data exceeds predefined thresholds (e.g., four, six, eight, ten, etc.), the number may be indicative that a user is utilizing a synthetic identity.

The synthetic identity detection network 100 may generate a synthetic identity code at operation 208. The synthetic identity code may provide an indication of a likelihood of the user being a synthetic identity. For example, the synthetic identity code may indicate that the likelihood of the user being a synthetic identity is less than a predetermined threshold, such as about 50%, 40%, 30%, 20%, 10%, 5%, 3%, 1%, etc. In other embodiments, the synthetic identity code may indicate that the likelihood of the user being a synthetic identity is greater than a predetermined threshold, such as about 50%, 60%, 70%, 80%, 90%, 95%, 97%, 9%, etc. Generating the synthetic identity code may include passing a number of variables into an algorithm to determine the synthetic identity code. For example, in some embodiments the variables may include a count of the plurality of user identities (all user identities that match any form of PII data from the inquiry and/or all user identities that match one or more particular forms of PII data) and the account statuses. Other variables may include an address classification of one or more addresses associated with the plurality of user identities, whether a user identify associated with a tax payer identifier is listed as having been deceased, and/or other variables.

In some embodiments, each of the number of variables may be assigned a predetermined weight within the algorithm. The variables may each be assigned an equal weight in some embodiments, or one or more of the variables may be assigned a higher or lower weight than other variables. The weights may be assigned based on empirical evidence and/or other factors to provide an accurate assessment of the risk that a user is utilizing a synthetic identity and/or to provide a desired risk threshold associated with the use of a synthetic identity. For example, negative account statuses (e.g., closed for cause, etc.) may be weighted twice as heavily as a number of user identities that match some or all of the PII data, while the use of a tax payer identifier associated a deceased individual may be weighted heavier than the negative account statuses. It will be appreciated that the combinations of variables and/or weights described above are merely examples, and that any combination of variables and/or weights may be used to generate the synthetic identity code.

The synthetic identity code may take various forms. For example, the synthetic identity code may be a numerical (or other value) code that may indicate a particular level of risk (e.g., a percentage) that the user is using a synthetic identity. In some embodiments, in addition to or alternatively to indicating a particular level of risk, the synthetic identity code may be indicative of a certain type of behavior. For example, the synthetic identity code may be selected from a number of pre-established synthetic identity codes, with each synthetic identity code indicating a particular rationale associated with the likelihood of the user being a synthetic identity. As just one example, the synthetic identity code may indicate a primary and/or secondary reason that the risk is high that the user is a synthetic identity. For example, the rationale may explain that one or more of the variables (e.g., a count of the plurality of user identities (all user identities that match any form of PII data from the inquiry and/or all user identities that match one or more particular forms of PII data), the account statuses, an address classification of one or more addresses associated with the plurality of user identities, whether a user identify associated with a tax payer identifier is listed as having been deceased, and/or other variables) indicates a high likelihood that a synthetic identity is being utilized. For example, in a particular embodiment, the synthetic identity code may indicate that a number of different user identities associated with a mailing address in the PII data is excessive (e.g., is likely not a family unit and/or a number of users exceeds an expected number of people to reside at the particular mailing address) and is indicative of the use of a synthetic identity. In some embodiments, the synthetic identity code may be selected from one of a number of pre-established codes, with each code providing its own rationale and/or indication of a particular likelihood (e.g., percentage) of a synthetic identity being utilized. In some embodiments, at least some of the synthetic identity codes may include one or more sub-rationales categorized under the overall rationale of the respective synthetic identity code. As just one example, the synthetic identity code A1 may indicate that that a number of different user identities associated with a mailing address in the PII data is excessive and at least one user identified as being associated with the PII data is associated with a deceased person, while synthetic identity code A1 may indicate that that a number of different user identities associated with a mailing address in the PII data is excessive and that the mailing address associated with at least one user identity matching the PII data was a non-residential address.

Table 1 below illustrates an example algorithm for generating a synthetic identity code according to some embodiments of the present technology.

| Synthetic Identity Code | Number of user identities associated with an email address (Variable 1) | Number of accounts closed for cause (Variable 2) | Was a taxpayer identifier associated with a deceased individual (Variable 3) | Type of mailing address (Variable 4) |
| --- | --- | --- | --- | --- |
| A1 | >8 | <2 | Yes | Residential |
| A2 | >8 | >4 | No | N/A |
| A3 | >6 | N/A | No | Business |
| B1 | <6 | >4 | No | Business |
| B2 | <6 | >4 | Yes | Residential |
| C | <6 | <2 | No | Residential |

As illustrated above, the algorithm may take in one or more variables and generate a synthetic identity code based on the values of the given variables. The variables used for each synthetic identity code may be the same or may be different in various embodiments. As illustrated, each synthetic identity code having an "A" or a "B" prefix is associated with a "fail" or a high risk of a synthetic identity, and the synthetic identity code having a "C" prefix is associated with a "pass" or a low risk of a synthetic identity.

Each "A" synthetic identity code may be indicative that the high risk is primarily attributed to a first variable (e.g., Variable 1 for "A" and Variable 2 for "B"). For example, in Table 1, each "A" synthetic identity code indicates that a rationale for the high likelihood of risk is based on a higher number (e.g., over 6, over 8, and/or other threshold value) of user identities associated with an email address, while each "B" synthetic identity code indicates that a rationale for the high likelihood of risk is based on a high number of accounts closed for cause associated with the PII data. In some embodiments, each "A" and/or "B" synthetic identity code may further indicate a sub-rationale attributed to a second variable for the high likelihood of risk. For example, synthetic identity code A1 indicates that a taxpayer identifier in the PII data is associated with a deceased individual, synthetic identity code A2 indicates that the PII data is associated with a high number (e.g., more than four or other threshold value) of accounts closed for cause, and synthetic identity code A3 indicates that the mailing address is a business address (along with a high number of user identities associated with that address). Synthetic identity code B1 may indicate that the mailing address is a business address, while synthetic identity code B2 may indicate that a taxpayer identifier in the PII data is associated with a deceased individual.

It will be appreciated that the algorithm illustrated in Table 1 is merely provided as one example and that numerous variations exist with any number and/or combination of variables and/or weights. Additionally, various embodiments may include fewer or greater rationales and/or sub-rationales, or may utilize numerical scores and/or other techniques for indicating a level of risk and/or rationale for the risk.

Once the synthetic identity code has been generated, the synthetic identity network 100 may transmit the synthetic identity code to the requesting computer system using a communications interface and at least one of the networks 108. In some embodiments, along with the synthetic identity code, the synthetic identity network 100 may transmit an identity confidence score (which is discussed in greater detail below) that is indicative of likeliness that the user is who he/she represents himself/herself to be. Together, the synthetic identity code and the identity confidence score may provide an accurate indication of whether a particular user identified by the PII data is the actual person for which the requesting computing device 104 is requesting information.

Figure 3:
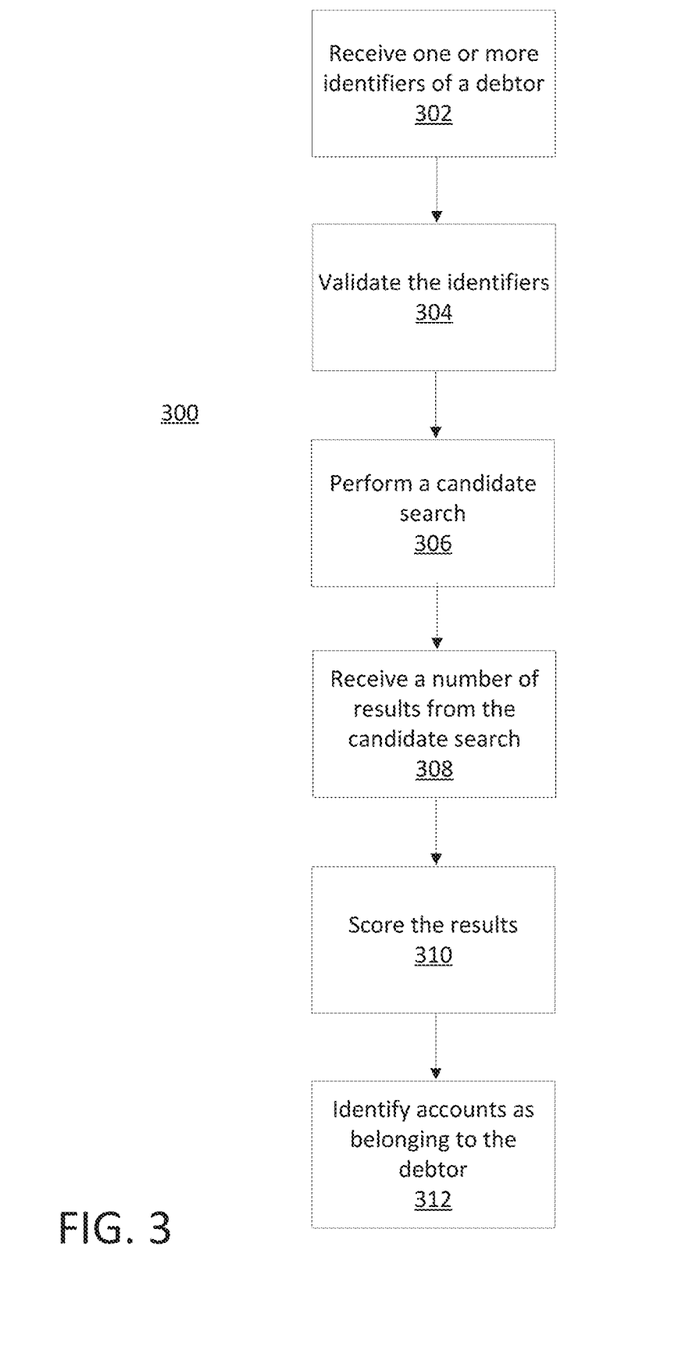
FIG. 3 is a flowchart depicting an entity resolution process according to embodiments of the present invention.

FIG. 3 is a flowchart illustrating one embodiment of an entity resolution process 300 in accordance with the present invention. Process 300 may be performed by the synthetic identity detection network 100 and/or an entity and/or device/network that works in conjunction with the synthetic identity detection network 100. For example, process 300 may be performed as part of process 200 described above, and may be used to identify and access financial accounts and/or data from third party data sources 106 associated with the identified debtor 102. Process 300 may begin at operation 302 by the synthetic identity detection network 100 receiving one or more identifiers (such as PII) from a requesting computing system 104. These identifiers may include, without limitation, the debtor's name, tax payer identifier (including a social security number), business registration and/or tax identifier, driver's license identifier, email address, employer identification number, military identifier, residency and/or citizenship identifier, passport number, registered charity number, residence alien identifier, a state-issued identifier, a student identifier, a voter identification number, a date of birth, an address, a phone number, and/or other identification means. At operation 304, the identifiers may be validated, such as by scrubbing the identifiers for default and incorrect values of various fields. For example, only those identifiers that include a predetermined number of characters in length (e.g., 5 characters), that have a predetermined number of unique characters (e.g., 3 unique characters), and/or having at least one digit (or some other number of digits) may be used to look up the debtor's financial accounts. In some embodiments, one or more additional (or alternative) validation steps may be performed. For example, tax payer identification numbers (TINs) may be scanned for invalid values (e.g., 123456789, 987654321, 00101001, etc.). A TIN may be deemed invalid if all digits are the same, if the first three digits start with a certain sequence (e.g., 000 or 666) and/or satisfies a number of other conditions that may indicate that the TIN is not valid. For phone numbers, the synthetic identity detection network 100 may remove any non-digit characters (e.g., hyphens, parentheses, periods, etc.), ensure that the phone number matches a pre-determined length (e.g., 10 digits), and/or whether the phone number includes any sequences of digits that are known to be invalid.

After the identifiers have been validated, a candidate search may be performed at operation 306. The candidate search may involve using one or more of the identifiers to search for financial accounts associated with matching identification data. Oftentimes, it may be advantageous to use unique identifiers (e.g., TIN, SSN, etc.) rather than the name of the particular person associated with the inquiry (which may not be unique to a given person) during the candidate search. The synthetic identity detection network 100 may enter the selected identifier(s) into a search tool that queries one or more databases of financial accounts across one or more financial institutions 100 to generate a list of one or more financial accounts that possibly belong to the particular person. In embodiments which a name is used as the identifier, the synthetic identity detection network 100 may tokenize the name, split the name by spaces, omit any token under a predefined length (such as 2 characters), alias the name tokens, and/or otherwise process the name. For addresses, the synthetic identity detection network 100 may tokenize the street and split into spaces and/or common address words and/or abbreviations (e.g., street, avenue, road, east, west, etc.) may be removed. In some embodiments a predetermined number of tokens must remain after processing steps for the address to be used in the candidate search.

A number of results from the candidate search may be returned at operation 308. The results may each be associated with a financial account. The results may include any financial accounts and/or third party data entries that are associated with an exact match of a unique identifier. The results may also include other matches. For example, the results may include matches that include names that exhibit a predetermined level of similarity to one or more of the searched identifiers. After identification of results, all (or a predetermined top number) of the results may be scored at operation 310. The scoring may be performed using some or all types of identifiers associated with financial accounts identified in the candidate search. The scoring may include determining whether an account holder name matches the particular person. This may include standardizing the name components from account holder names associated with retrieved accounts. For example, the name may be broken down into tokens and non-letter characters may be removed. For each name component (e.g., prefix, given name, family name, suffix, etc.) a lookup may be performed to identify if there are one or more standard forms of the given name component. The lookup may return the original name components, any standardized components (linked by original component), abbreviated forms of any names(de-duplicated), encoded forms of names (de-duplicated), concatenated forms of the original name components (e.g., the name of the particular person as provided in the inquiry), a gender estimation based on the original components provided, and/or other information. For example, if the following name were entered for lookup: "Ms. Debbie Sue Smith Johnson," the results may include the data in Table 2 below:

TABLE 2

| Original | Standard Form(s) | Abbreviated | Encoded | Concatenated |
| --- | --- | --- | --- | --- |
| DEBBIE | DEBBIE, DEBORAH | D | TP | |
| SUE | SUE, SUSAN | S | S | DEBBIESUE |
| SMITH | SMITH | S | SM0, XMT | SUESMITH |
| JOHNSON | JOHNSON | J | JNSN, ANSN | SMITHJOHNSON |

Based on such matching techniques, each retrieved name may be scored based on how closely it matches a name included in identification information associated with the inquiry. In some embodiments, each name component may be scored individually, with the individual component scores being combined to generate a match score. For example, an exact match of a given original name component may receive a maximum score, while a match of a standardized component, abbreviated form, encoded form, and/or concatenated form may result in a high, but not maximum score. Each non-original form may be associated with a certainty factor associated with a type of the form that is multiplied to the component score to generate a weighted score. For example, a single-letter abbreviation may have a low certainty factor (such as 0.3), indicating that there is a high degree of uncertainty that the abbreviation (such as "J" for Johnson) corresponds to the intended name match, while the use of an alternate form of a name (such as Susan for Sue) may include a higher certainty factor (such as 0.6). The scores for each name component may be aggregated (such as by summing the weighted scores) to generate an overall name score. Non-name identifiers may be similarly scored, with exact matches getting maximum scores, close matches (such as within one digit) may have moderate scores, and/or larger deviations having low or zero scores. The scores may be weighted and/or added to generate an overall account score.

Once the account score is generated for each result of the candidate search, the overall scores may be compared to a cutoff threshold score to identify matches that are highly likely to belong to the person associated with the inquiry. In some embodiments, the financial accounts having scores at or above the threshold score may be analyzed to see if the records meet minimum requirements for a match. For example, a predetermined number of identifiers (such as 3 identifiers) may need to be present in each result. If only the account holder name (or other non-unique identifier) matches the person associated with the inquiry, the result may be thrown out due to the uncertainty of the match. If one or more unique identifiers match between a result and the person associated with the inquiry, the result may be included as a match. At operation 312, accounts and/or other information associated with the matches may be identified as belonging to the person associated with the inquiry and/or may be accessed for account data as detailed with respect to process 200 described above.

Figure 4:
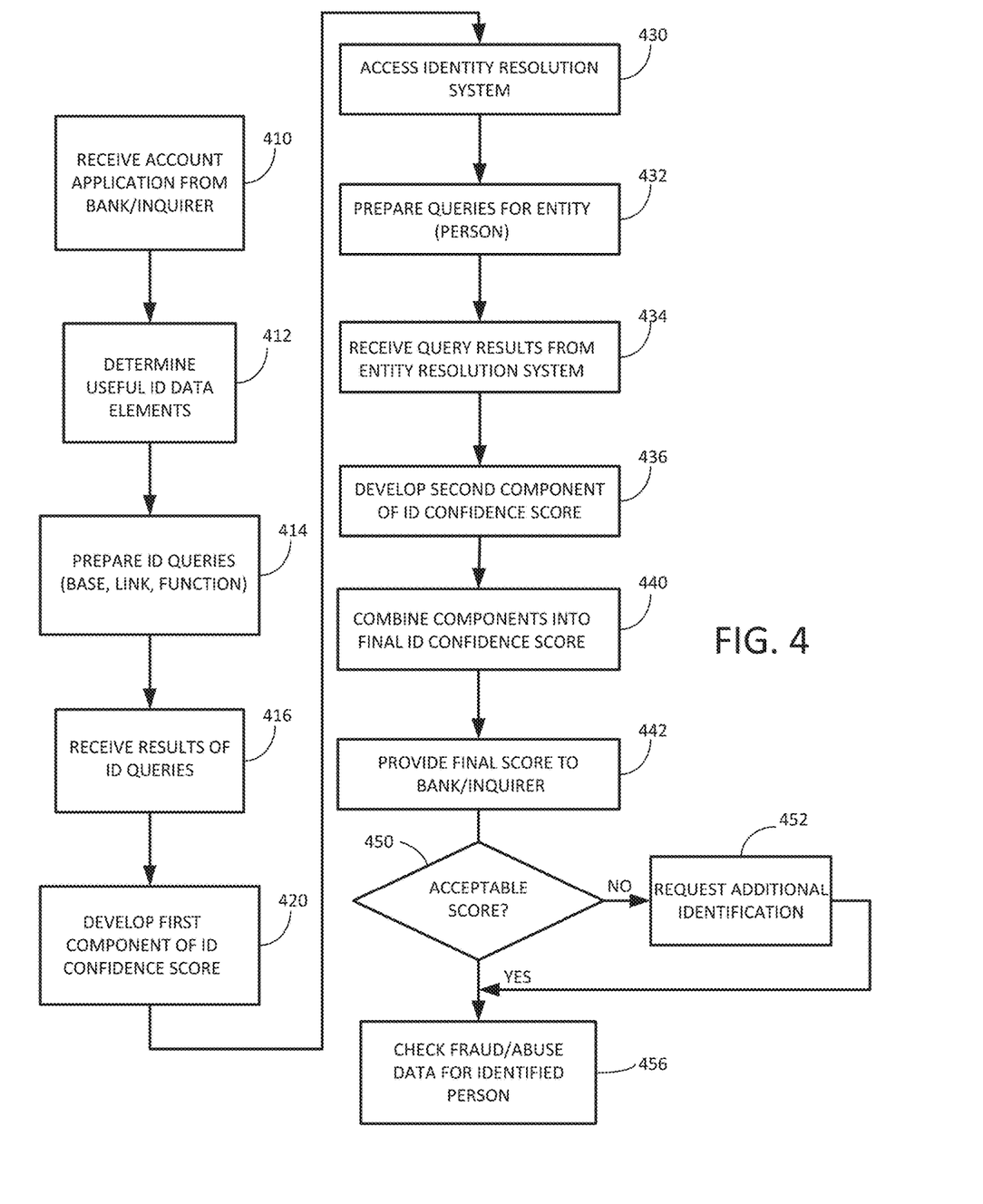
FIG. 4 is a flowchart depicting a process for developing an ID confidence score according to embodiments of the present invention.

As discussed above, in some embodiments, the synthetic identity code may be provided with an ID confidence score. As one example, systems and methods for generating ID confidence scores can be found in U.S. Pat. No. 9,836,510, which is incorporated herein by reference for all purposes. FIG. 4 illustrates one example process for developing an ID confidence score based on the identity data (e.g., PII data) received in the inquiry. The process begins at step 410, with a scoring system (which may be part of and/or otherwise in communication with the synthetic identity detection network 100) receiving PII data from the requesting computing system 104, e.g., as part of a request to score identity data. At step 412, the scoring system parses the application data in order to determine identity data elements that can be used for scoring the identity data provided by the requesting computing system 104 (i.e., providing a score which reflects the likelihood that the applicant is in fact the person/entity that the applicant claims to be).

The scoring system then prepares identity queries (step 414) that are used in analyzing relevant data records stored at one or more of the databases 102 and/or third party data sources 106. In preparing appropriate queries at step 414, the scoring system determines, for each query, three query components, namely (1) a base component, (2) a link component and (3) a function component. The base and link components are two different identity data elements for the identity data elements determined at step 412, and in the described embodiment, each would be one of the identity data elements seen in Table I. The function component is a functional relationship between the base component and link component that is looked for in the data records that are stored within the databases 102 and/or third party data sources 106. Queries are provided to a data management system for processing against data records in the data storage system. The results of each query are received (via the data management system) at the scoring system based on analysis of the data records in the databases 102 and/or third party data sources 106.

The following Table 3 illustrates function components that may be used within each query:

TABLE 3

| Function | Description |
| --- | --- |
| Count | The number of times the specified base component is seen with any link component |
| Unique Count | The number of different link components that are see seen in with a specified base component |
| Days Range | The number of days between the first occurrence of a record where the base and link components both appear and the most recent occurrence of a record where the base and link components both appear |

TABLE 3-continued

| Function | Description |
| --- | --- |
| Source Count | The number of different data sources where a specified base component appears with any link component |
| Source Match Account | The number of different data sources where a specified base component appears with a specified link component (both base and link in a data source record match those specified in a query) |
| Fraud Count | The number of times a specified base component and specified link component both appear in a fraud data record |
| Abuse Count | The number of times a specified base component and a specified link component both appear in an abuse data record |
| Match Count | The number of times the specified base component is seen with the specified link component in any data record (as will be described later, near matches are included if they have sufficient closeness specified by a matching framework score) |
| Match Last Seen Days | The number of days since the most recent data record in which the specified base component is seen with the specified link component |
| Rate Match Count/Count | The number of times the specified base component is seen with the specified link component, divided by the number of times the specified base component is seen with any link component |
| Maximum Matching Framework Score | In a match count (where the base is deemed an exact match), the highest matching framework score of the matching link (matching framework score will be described in greater detail below) |
| Matching Framework Score of the Most Occurring Link Component | In a match count, the matching framework score of the most frequently occurring data record that has a specified link component |
| Count of Records Contained in Query | In a match count, the number of result records where a link value/component is not an exact match but it has value contained within the specified link value/component of the query (e.g., a result record having "Dan" and the specified link value in the query is "Daniel") |
| Count of records Containing Inquiry | In a match count, the number of result records where a link component is not an exact match but it has a value that contains the specified link component (e.g., a result record having "Daniel" and the specified link value in the query is "Dan") |
| Last Seen Matching Framework Score | In a match count, the matching framework score of the most recent matching result record |
| First Seen Matching Framework Score | In a match count, the matching framework score of the oldest matching result record |
| Shared Chief (Most Common) Value | In a match count, for result records where the base component is an exact match and the link component is a near match, determine the most commonly appearing link component value. The shared chief value is the number of data records that have different base components associated with the most commonly appearing link component value. |
| Reversal Chief (Most Common) Value | In a match count, for result records where the base component is an exact match and the link component is a near match, determine the most commonly appearing link component value. The reversal chief value is the most commonly appearing base component value associated with the determined most commonly appearing link component value (found in other data records) |
| Miles from Chief (Most Common) Address to Inquiry Address | When a base component matches and when a link component (which is an address) does not match, determine the most commonly occurring address in other data records that appear with the matching base component. This function is the number of miles from the most common nonmatching link (address) to the specified link (address). |

TABLE 3-continued

| Function | Description |
| --- | --- |
| Miles from Last Address to Inquiry Address | When a base component matches and when a link component (which is an address) does not match, determine the most recent data record having a matching base and the non-matching address. This function is the number of miles from that most recent non-matching address to the specified link component/value (address). |

Returning to FIG. 4, the results of the ID queries are received by the scoring system at step 416 and used to develop a first component of an ID confidence score at step 420. Examples of queries prepared at step 414 and used, in combination, by the ID confidence scoring system to develop a ID confidence score (or a first component of an ID confidence score) will be provided later.

After the first component of the ID confidence score is developed at step 420, the scoring system may perform an entity resolution process (such as that disclosed in relation to FIG. 3) at step 430 and prepares queries for a specified person, step 432. As described earlier, the entity resolution process collects data into groups or data node networks, which are stored at one or more storage devices. Each data node network stored at a storage device is associated with a single person or entity. The entity resolution process involves receiving the identity data elements determined at step 412 and finding a data node network that has the closest/best match to those identity data elements. The queries at step 432 are largely directed to that matched data node network (or other closely matched data node networks).

The following Table 4 illustrates for queries made during the entity resolution process:

TABLE 4

| Query | Description |
| --- | --- |
| Number of First Names | For the closest matching entity, the number of first names that this entity appears to be using as evidenced in the matching data node network |
| Number of Last Names | For the closest matching entity, the number of last names that this entity appears to be using as evidenced in the matching data node network |
| Closeness of Entity | For the closest matching entity, a score for the degree of match/closeness |
| Closeness of Next Closest Entity | For the next closest entity to the matching entity, a score for the degree of closeness |

Closeness of Entity

In one embodiment, this may be a score reflecting the closeness or the degree of match based on a matching framework score, calculated by measuring the distance (closeness) between a representative identity data element (e.g., social security number) for the person specified at step 432 and a corresponding identity data element in the data node network closest to the specified person as determined, e.g., by a matching framework score (or an average distance between the representative identity data element for the specified person and each of the corresponding identity data elements in the data node network).

Closeness of Next Closest Entity

In one embodiment, this may be a score reflecting the closeness of the next closest entity based on a matching framework score, calculated by measuring the distance (closeness) between a representative identity data element for the person specified at step 432 and a corresponding identity data element in the next closest the data node network (or measuring the average distance between the representative identity data element for the specified person and each of the corresponding identity data elements in the next closest data node network).

The results of the queries to the entity resolution system are received at the ID confidence scoring system at step 434 and are used to develop a second component of the ID confidence score at step 436. Those two components are combined at step 440 and a final or complete ID confidence score is provided to the requesting computing system 104 at step 442. The score provided at step 442 may be a numerical score, say on a scale of 0-100, with 100 reflecting the highest possible confidence and 0 reflecting the lowest possible confidence. The bank receiving that score at step 442 determines whether the score is acceptable for it to proceed with opening an account, step 450.

Figure 5:
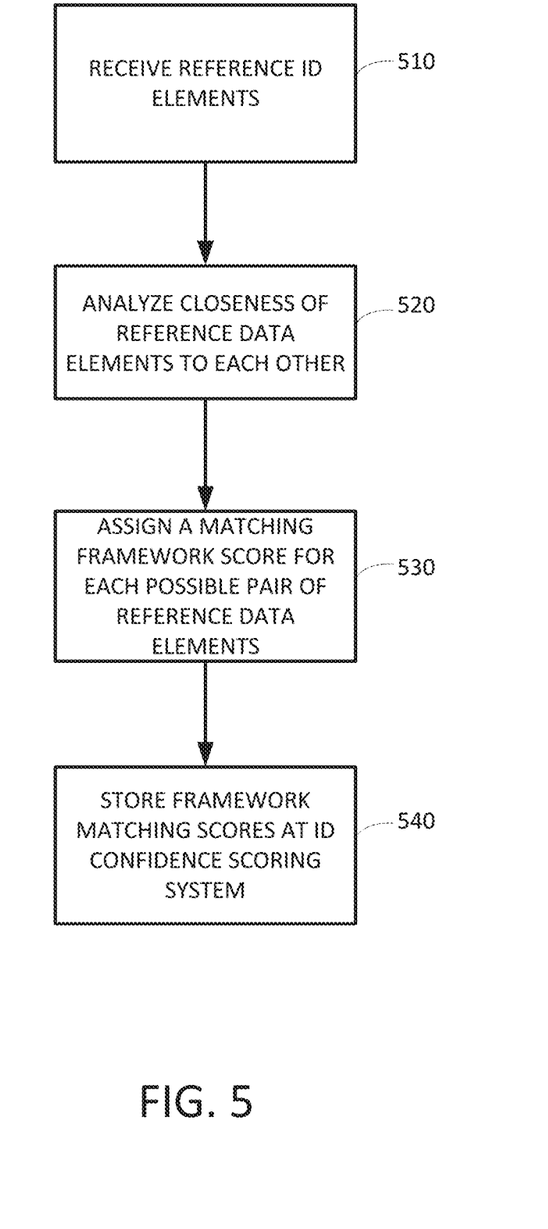
FIG. 5 is a flowchart depicting a process for developing matching framework scores according to embodiments of the present invention.

FIG. 5 illustrates a process for developing matching framework scores for various base and link component values used in the queries described above in connection with step 414 (FIG. 3). At step 510, the ID confidence scoring system receives reference ID elements that might appear in various queries. These will be large in number. For example, for each possible data element that represents a first name, variations of that first name will be provided. As a more specific example, if a reference ID element for a first name is "Daniel," the ID confidence scoring system will receive all variations of the first name "Daniel," such as "Dan," "Danny," "Danielle," and so forth. At step 520, the closeness of each reference data element to every other reference data element is analyzed, and a matching framework score for each possible pair of reference data elements is assigned at step 530.

Various methods can be used for establishing the closeness (similarity) for each pair of possible reference data elements at step 520, with one such method being a Levenshtein distance method. Briefly, such a method calculates a "distance" between two terms by calculating the minimum number of single-character edits that are needed to change one term to another term. A further description of such method can be found at wikipedia.org/wiki/Levenshtein)_distance. In one embodiment of the invention, the matching framework score may be developed using the Levenshtein distance method along with additional calculations, such as the weighted average of the distance between corresponding data elements of two data records (e.g., when a base component and a link component of a query are deemed to match, the matching framework score of the matching link may be the weighted average distance between corresponding data elements of the data record having the base and of the data record having the link).

It should be appreciated that the scoring system can be programmed to determine that certain words and their common abbreviations (e.g., Joseph and Jos.) and certain words and their first letter (John and J.) can be viewed as exact matches or be assigned, as a pair, a predetermined matching framework score. It should also be appreciated that matching framework scores are not limited to defining the closeness of names of people, but rather can also be used in connection with street names, street numbers, Social Security numbers, phone numbers and so forth.

The result of the analysis at step 520 is a distance (closeness) score which can be a numerical value, say from 0-100, with for example, 0 being the greatest possible distance between two terms and 100 being an exact match.

Steps 520 and 530 are repeated for every possible pair of reference data elements.

While the process illustrated in FIG. 5 contemplates steps 520 and 530 being performed well in advance (of any calculation of ID confidence scores), it should be appreciated that during the development of an ID confidence score in the process illustrated in FIG. 4 (steps 434 and 436), analyzing and assigning a matching framework score may be accomplished on the fly as new data elements are identified at the ID confidence scoring system (e.g., at step 412) during the development of an ID confidence score. For example, if a new identity element not previously reviewed is received at the scoring system, such term can be analyzed for closeness to other terms and a matching framework score established for each new pair of terms.

Finally, at step 540, the matching framework scores are stored at the scoring system and are used as new queries are processed at the scoring system for purposes of developing ID confidence scores.

It should be appreciated that in the queries prepared at step 414 (FIG. 4), the bank/inquirer can establish a predefined matching framework score that will be used at the scoring system in order for a match to be determined (i.e., the bank/inquirer will provide a matching framework score to the scoring system in advance, based on its business practices or preferences, and representing the desired degree of closeness or near match for any two terms in order for those terms to be determined as a match). Alternatively, the scoring system can be designed to automatically establish a predetermined framework matching score in order to determine if identity elements are deemed to match (or to be near matches).

The following are examples of queries prepared at steps 414 and 432 in the process of FIG. 4, and used to develop a final ID confidence score at step 440:

Example I

First Component (Query is formatted as [Base]•[Link]•[Function])
Query 1: [TIN]•[PHN]•[Match Count] (the number of times the specified taxpayer identification number is seen with the specified phone number)
Query 2: [PHN]•[TIN]•[Unique Count] (the number of phone numbers seen with the specified taxpayer identification name)
Query 1 has a return result of: 25 (the person with the specified TIN is found 25 times with the specified phone number in accessed examined/data records)
Query 2 has a return result of: 1 (there is only one phone number found in all examined records for the person with the specified TIN)
First Component Score: 90 (0-100, where 0 represents low confidence in the identity data and 100 represents high confidence)

Second Component

Entity Query 1: [NFN] (for the closest matching entity, the number of first names that the specified entity is using)
Entity Query 2: [NLM] (for the closest matching entity, the number of last names that the specified entity is using)
Entity Query 1 has a return result of: 2 (the specified entity has used only two different first names)
Entity Query 1 has a return result of: 1 (the specified entity has used only one last name)
Second Component Score: 90
Complete ID Confidence Score: 90 (represents a high degree of confidence)

Example II

First Component

Query 1: [TIN]•[Name]•[Unique Count]
Query 2: [TIN]•[Name]•[Match Count]
Query 1 has a return result of: 35 (the person with the specified TIN is using 35 different names)
Query 2 has a return result of: 0 (the person with the specified TIN is using a name that is not been seen before in any records)
First Component Score: 5

Second Component

Entity Query 1: [CE] (closeness of matching entity)
Entity Query 2: [CNCE] (closeness of next closest entity)
Entity Query 1 has a return result of: 5 (the closest matching entity is not all that close)
Entity Query 1 has a return result of: 5 (the next closest entity is not all that close and there is not much distinguishing this person from others)
Second Component Score: 5
Complete ID Confidence Score: 5 (represents a low degree of confidence)

Figure 6:
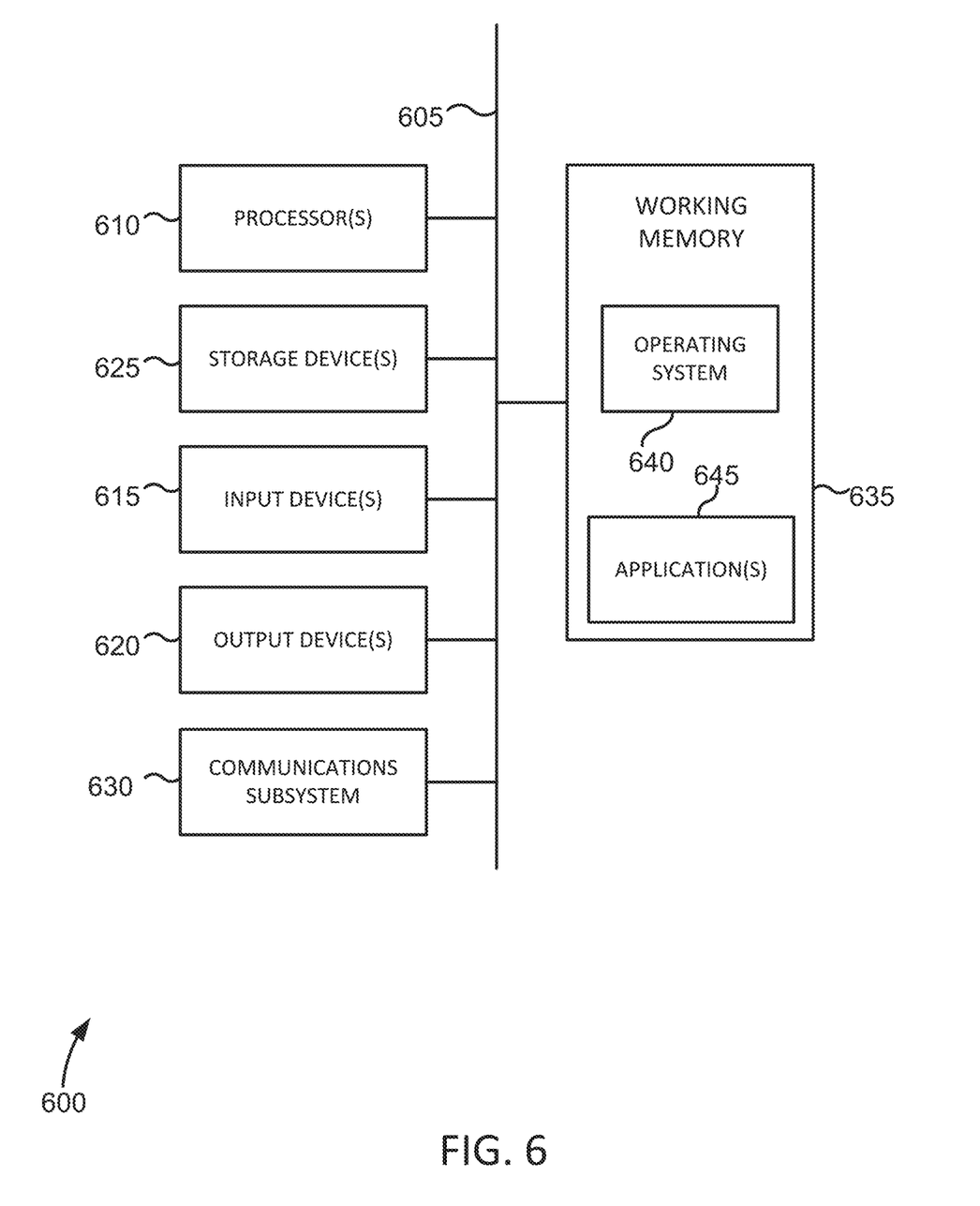
FIG. 6 illustrates a block diagram of a computing device according to embodiments of the present invention.

A computer system as illustrated in FIG. 6 may be incorporated as part of the previously described computerized devices. For example, computer system 600 can represent some of the components of computing devices that operate the MaaS operator software, MaaS platform 1, the end-user device, and/or other computer devices that facilitate operation of the systems and methods described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, a camera, a smartcard reader, a contactless media reader, and/or the like; and one or more output devices 620, which can include without limitation a display device and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A synthetic identity detection network, comprising:
   a communications interface;
   one or more processors; and
   a memory having instructions stored thereon that, when executed by the one or more processors cause the one or more processors to:
   receive, using the communications interface, a synthetic identity data inquiry from a requesting computing system, the synthetic identity data inquiry comprising personally identifiable information (PII) data associated with a user;
   match the PII data to a plurality of user identities, wherein each of the plurality of user identities is associated with at least a portion of the PII data associated with the user;
   identify an account status associated with each of one or more accounts associated with the plurality of user identities;
   generate a synthetic identity code based at least in part on a count of the plurality of user identities and the account statuses, the synthetic identity code providing an indication of a likelihood of the user being a synthetic identity; and
   transmit, using the communications interface, the synthetic identity code to the requesting computer system.

2. The synthetic identity detection network of claim 1, wherein:
the PII data comprises an email address associated with the user, a mailing address associated with the user, and tax identifier associated with the user.

3. The synthetic identity detection network of claim 2, wherein:
the instructions cause the one or more processors to identify a type of the mailing address.

4. The synthetic identity detection network of claim 3, wherein:
identifying the type of the mailing address comprises receiving a code that is indicative of the type of the mailing address.

5. The synthetic identity detection network of claim 1, wherein:
matching the PII data to the plurality of user identities comprises performing an entity resolution process.

6. The synthetic identity detection network of claim 1, wherein the instructions cause the one or more processors to:
generate an identity confidence score associated with the user, the identity confidence score being indicative of a likelihood that the user has provided an authentic identity; and
provide the identity confidence score to the requesting computer system.

7. The synthetic identity detection network of claim 1, wherein:
the synthetic identity code is selected from a plurality of synthetic identity codes; and
each of the plurality of synthetic identity codes is indicative of a certain type of behavior and likelihood that a synthetic identity is being utilized.

8. A method of generating a synthetic identity code, comprising:
receiving a synthetic identity data inquiry from a requesting computing system, the synthetic identity data inquiry comprising personally identifiable information (PII) data associated with a user;
matching the PII data to a plurality of user identities, wherein each of the plurality of user identities is associated with at least a portion of the PII data associated with the user;
identifying an account status associated with each of one or more accounts associated with the plurality of user identities;
generating a synthetic identity code based at least in part on a count of the plurality of user identities and the account statuses, the synthetic identity code providing an indication of a likelihood of the user being a synthetic identity; and
transmitting the synthetic identity code to the requesting computer system.

9. The method of generating a synthetic identity code of claim 8, wherein:
the PII data comprises a mailing address associated with the user; and
the method further comprises reformatting the mailing address into a standardized post office format.

10. The method of generating a synthetic identity code of claim 8, wherein:
generating the synthetic identity code comprises passing a number of variables into an algorithm to determine the synthetic identity code;
the number of variables comprise the count of the plurality of user identities and the account statuses; and
each of the number of variables is assigned a predetermined weight.

11. The method of generating a synthetic identity code of claim 8, wherein:
matching the PII data to a plurality of user identities comprises comparing each item within the PII data to stored PII data associated with known user identities that is stored on one or more databases.

12. The method of generating a synthetic identity code of claim 8, wherein:
the synthetic identity code indicates that the likelihood of the user being a synthetic identity is less than about 10%.

13. The method of generating a synthetic identity code of claim 8, wherein:
the synthetic identity code further indicates a rationale associated with the likelihood of the user being a synthetic identity.

14. The method of generating a synthetic identity code of claim 8, wherein:
the synthetic identity code is selected from a plurality of synthetic identity codes;
each of the plurality of synthetic identity codes indicates an overall rationale associated with the likelihood of the user being a synthetic identity; and
at least some of the plurality of synthetic identity codes comprise one or more sub-rationales categorized under the overall rationale of the respective synthetic identity code.

15. A non-transitory computer-readable medium having instructions stored thereon that, when executed by one or more processors, cause the one or more processors to:
receive a synthetic identity data inquiry from a requesting computing system, the synthetic identity data inquiry comprising personally identifiable information (PII) data associated with a user;
match the PII data to a plurality of user identities, wherein each of the plurality of user identities is associated with at least a portion of the PII data associated with the user;
identify an account status associated with each of one or more accounts associated with the plurality of user identities;
generate a synthetic identity code based at least in part on a count of the plurality of user identities and the account statuses, the synthetic identity code providing an indication of a likelihood of the user being a synthetic identity; and
transmit the synthetic identity code to the requesting computer system.

16. The non-transitory computer-readable medium of claim 15, wherein:
the PII data comprises a tax payer identifier; and
the instructions cause the one or more processors to determine whether the tax payer identifier is associated with a living person.

17. The non-transitory computer-readable medium of claim 15, wherein:
generating the synthetic identity code is further based on one or both of a type of a mailing address of the user and a living status associated with a tax identifier of the user.

18. The non-transitory computer-readable medium of claim 15, wherein:
the count of the plurality of user identities comprises at least one count selected from a group consisting of a count of a number of user identities associated with a particular email address, a count of a number of user identities associated with a particular mailing address, a count of a number of user identities associated with a particular account, and a count of a number of user identities associated with a particular phone number.

19. The non-transitory computer-readable medium of claim 15, wherein:
matching the PII data to the plurality of user identities comprises performing an entity resolution process to standardize a format of at least some items within the PII data to identify the plurality of user identities.

20. The non-transitory computer-readable medium of claim 15, wherein:
at least one account status indicates that an associated account was closed for cause.

* * * * *